United States Patent
Sudarsan et al.

(10) Patent No.: US 11,867,789 B2
(45) Date of Patent: Jan. 9, 2024

(54) OPTIMIZED PROXIMITY CLUSTERING IN A VEHICLE RADAR FOR OBJECT IDENTIFICATION

(71) Applicant: Metawave Corporation, Carlsbad, CA (US)

(72) Inventors: Shashankar Sudarsan, San Marcos, CA (US); Armin Rainer Völkel, Mountain View, CA (US)

(73) Assignee: Metawave Corporation, Carlsbad, CA (US)

( * ) Notice: Subject to any disclaimer, the term of this patent is extended or adjusted under 35 U.S.C. 154(b) by 251 days.

(21) Appl. No.: 17/143,993

(22) Filed: Jan. 7, 2021

(65) Prior Publication Data
US 2021/0208242 A1    Jul. 8, 2021

Related U.S. Application Data

(60) Provisional application No. 62/958,288, filed on Jan. 7, 2020.

(51) Int. Cl.
    *G01S 7/292*      (2006.01)
    *G01S 13/72*      (2006.01)
    *G01S 13/89*      (2006.01)
    *G01S 13/58*      (2006.01)

(52) U.S. Cl.
    CPC .......... *G01S 7/2923* (2013.01); *G01S 13/584* (2013.01); *G01S 13/726* (2013.01); *G01S 13/89* (2013.01)

(58) Field of Classification Search
    CPC .... G01S 7/2923; G01S 13/584; G01S 13/726; G01S 13/89; G01S 13/42; G01S 13/931
    See application file for complete search history.

(56) References Cited

U.S. PATENT DOCUMENTS

| | | | |
|---|---|---|---|
| 2017/0059695 A1* | 3/2017 | Fetterman | G01S 13/931 |
| 2020/0074729 A1* | 3/2020 | Yan | G06F 18/251 |
| 2020/0182969 A1* | 6/2020 | He | G01S 7/003 |
| 2020/0326418 A1* | 10/2020 | Keijer | G01S 13/72 |
| 2021/0124011 A1* | 4/2021 | Madhow | G01S 13/86 |
| 2021/0199792 A1* | 7/2021 | Emadi | G01S 13/18 |

* cited by examiner

*Primary Examiner* — Donald H B Braswell (57) ABSTRACT

Examples disclosed herein relate to a radar system and method of optimizing proximity clustering. The method includes generating radar data from return radio frequency beams with a radar system and detecting objects from the radar data, and generating a three-dimensional pixel map from the radar data including direction of arrival data. The method includes traversing the pixel map to identify other pixels containing detected objects neighboring a subject pixel and determining whether the subject pixel and a neighbor pixel are assigned to clusters. The method includes assigning the neighbor pixel to a same cluster as that of the subject pixel when only the subject pixel is assigned to a cluster, assigning the subject pixel to a same cluster as that of the neighbor pixel when only the neighbor pixel is assigned to a cluster, and merging clusters when the subject pixel and the neighbor pixel are assigned to different clusters.

19 Claims, 7 Drawing Sheets

OPTIMIZED PROXIMITY CLUSTERING IN A VEHICLE RADAR FOR OBJECT IDENTIFICATION

CROSS-REFERENCE TO RELATED APPLICATIONS

This application claims priority from U.S. Provisional Application No. 62/958,288, titled "Optimized Proximity Clustering In A Vehicle Radar For Object Identification," filed on Jan. 7, 2020, and incorporated herein by reference in its entirety.

BACKGROUND

Autonomous driving is quickly moving from the realm of science fiction to becoming an achievable reality. Already in the market are Advanced-Driver Assistance Systems ("ADAS") that automate, adapt and enhance vehicles for safety and better driving. The next step will be vehicles that increasingly assume control of driving functions such as steering, accelerating, braking and monitoring the surrounding environment and driving conditions to respond to events, such as changing lanes or speed when needed to avoid traffic, crossing pedestrians, animals, and so on. The requirements for object and image detection are critical and specify the time required to capture data, process it and turn it into action. All this while ensuring accuracy, consistency and cost optimization.

An aspect of making this work is the ability to detect and classify objects in the surrounding environment at the same or possibly at an even better level than humans. Humans are adept at recognizing and perceiving the world around them with an extremely complex human visual system that essentially has two main functional parts: the eye and the brain. In autonomous driving technologies, the eye may include a combination of multiple sensors, such as camera, radar, and lidar, while the brain may involve multiple artificial intelligence, machine learning and deep learning systems. The goal is to have full understanding of a dynamic, fast-moving environment in real time and human-like intelligence to act in response to changes in the environment.

BRIEF DESCRIPTION OF THE DRAWINGS

The present application may be more fully appreciated in connection with the following detailed description taken in conjunction with the accompanying drawings, which are not drawn to scale and in which like reference characters refer to like parts throughout, and wherein.

DETAILED DESCRIPTION

Traditional data clustering algorithms are utilized in radar systems, such as K-means clustering and Density-based Spatial Clustering of Applications with Noise ("DBSCAN"), among others. However, these traditional data clustering algorithms have several disadvantages. For example, these data clustering algorithms require predetermination of the number of clusters, density parameters, the number of minimum points (minPts), etc. In such instances, the datasets of these data clustering algorithms also require to be understood well, because varying densities cause issues. Other disadvantages are that these data clustering algorithms are slow because they involve distance calculations recursions, and multiple iterations. For example, some traditional data clustering algorithms require a processing duration of 19 ms for analyzing 15 targets, which scales worse than $O(n)$ time complexity.

The subject technology provides for optimized proximity clustering in a vehicle radar for object identification. The subject technology does not require any parameters. The optimized proximity clustering of the subject technology can cluster arbitrary shapes and sizes. The clustering resolution of the subject technology can be limited by the radar resolution. The optimized proximity clustering can reduce the processing time to 40 µs for analyzing 200 targets and is $O(n)$ time complexity. In some aspects, the optimized proximity clustering includes 2D Range-Doppler Map (RDM) artificially projected to 3D based on angle-of-arrival information. The optimized proximity clustering takes advantage of target location information to facilitate building a data structure significantly faster. The subject technology also exploits linear independencies between adjacent bins.

It is appreciated that the detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology. In other instances, well-known methods and structures may not be described in detail to avoid unnecessarily obscuring the description of the examples. Also, the examples may be used in combination with each other.

Figure 1:
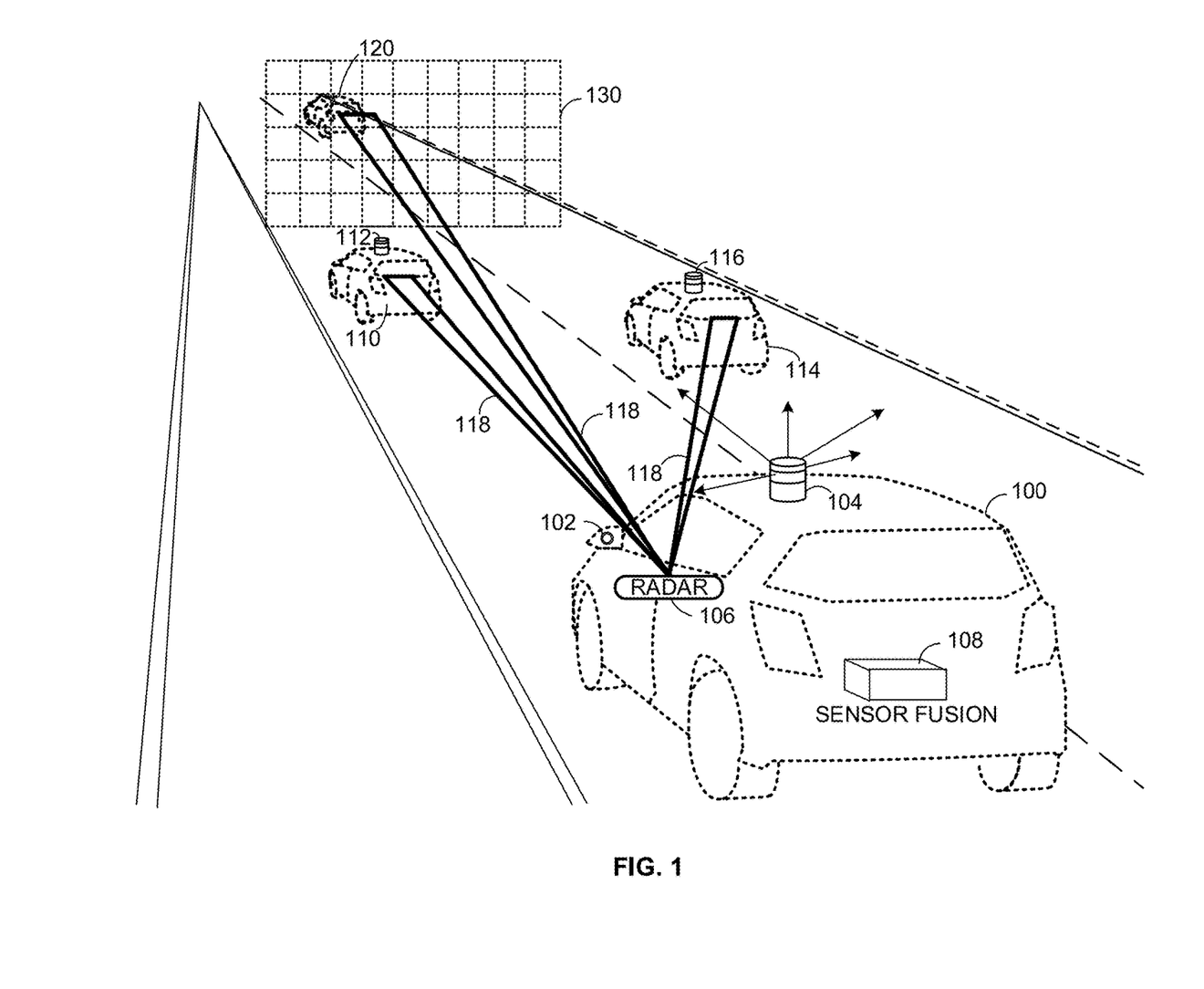
FIG. 1 illustrates an example environment in which a beam steering radar in an autonomous vehicle is used to detect and identify objects, according to various implementations of the subject technology.

FIG. 1 illustrates an example environment in which a beam steering radar in an autonomous vehicle is used to detect and identify objects, according to various implementations of the subject technology. Ego vehicle 100 is an autonomous vehicle with a beam steering radar system 106 for transmitting a radar signal to scan a FoV or specific area. As described in more detail below, the radar signal is transmitted according to a set of scan parameters that can be adjusted to result in multiple transmission beams 118. The scan parameters may include, among others, the total angle of the scanned area defining the FoV, the beam width or the scan angle of each incremental transmission beam, the number of chirps in the radar signal, the chirp time, the chirp segment time, the chirp slope, and so on. The entire FoV or a portion of it can be scanned by a compilation of such transmission beams 118, which may be in successive adjacent scan positions or in a specific or random order. Note that the term FoV is used herein in reference to the radar transmissions and does not imply an optical FoV with unobstructed views. The scan parameters may also indicate the time interval between these incremental transmission beams, as well as start and stop angle positions for a full or partial scan.

In various examples, the ego vehicle 100 may also have other perception sensors, such as a camera 102 and a lidar 104. These perception sensors are not required for the ego vehicle 100 but may be useful in augmenting the object detection capabilities of the beam steering radar 106. The camera 102 may be used to detect visible objects and conditions and to assist in the performance of various functions. The lidar 104 can also be used to detect objects and provide this information to adjust control of the ego vehicle 100. This information may include information such as congestion on a highway, road conditions, and other conditions that would impact the sensors, actions or operations of the vehicle. Existing ADAS modules utilize camera sensors to assist drivers in driving functions such as parking (e.g., in rear view cameras). Cameras can capture texture, color and contrast information at a high level of detail, but similar to the human eye, they are susceptible to adverse weather conditions and variations in lighting. The camera 102 may have a high resolution but may not resolve objects beyond 50 meters.

Lidar sensors typically measure the distance to an object by calculating the time taken by a pulse of light to travel to an object and back to the sensor. When positioned on top of a vehicle, a lidar sensor can provide a 360° 3D view of the surrounding environment. Other approaches may use several lidars at different locations around the vehicle to provide the full 360° view. However, lidar sensors such as lidar 104 are still prohibitively expensive, bulky in size, sensitive to weather conditions and are limited to short ranges (e.g., less than 150-300 meters). Radars, on the other hand, have been used in vehicles for many years and operate in all-weather conditions. Radar sensors also use far less processing than the other types of sensors and have the advantage of detecting objects behind obstacles and determining the speed of moving objects. When it comes to resolution, the laser beams emitted by the lidar 104 are focused on small areas, have a smaller wavelength than RF signals, and can achieve around 0.25 degrees of resolution.

In various examples and as described in more detail below, the beam steering radar 106 can provide a 360° true 3D vision and human-like interpretation of the path and surrounding environment of the ego vehicle 100. The beam steering radar 106 is capable of shaping and steering RF beams in all directions in a 360° FoV with at least one beam steering antenna and recognize objects quickly and with a high degree of accuracy over a long range of around 300 meters or more. The short-range capabilities of the camera 102 and the lidar 104 along with the long-range capabilities of the radar 106 enable a sensor fusion module 108 in the ego vehicle 100 to enhance its object detection and identification.

As illustrated, the beam steering radar 106 can detect both vehicle 120 at a far range (e.g., greater than 350 m) as well as vehicles 110 and 114 at a short range (e.g., lesser than 100 m). Detecting both vehicles in a short amount of time and with enough range and velocity resolution is imperative for full autonomy of driving functions of the ego vehicle. The radar 106 has an adjustable Long-Range Radar (LRR) mode that enables the detection of long-range objects in a very short time to then focus on obtaining finer velocity resolution for the detected vehicles. Although not described herein, radar 106 is capable of time-alternatively reconfiguring between LRR and Short-Range Radar (SRR) modes. The SRR mode enables a wide beam with lower gain but can make quick decisions to avoid an accident, assist in parking and downtown travel, and capture information about a broad area of the environment. The LRR mode enables a narrow, directed beam and long distance, having high gain; this is powerful for high speed applications, and where longer processing time allows for greater reliability. Excessive dwell time for each beam position may cause blind zones, and the adjustable LRR mode ensures that fast object detection can occur at long range while maintaining the antenna gain, transmit power and desired Signal-to-Noise Ratio (SNR) for the radar operation.

Figure 2:
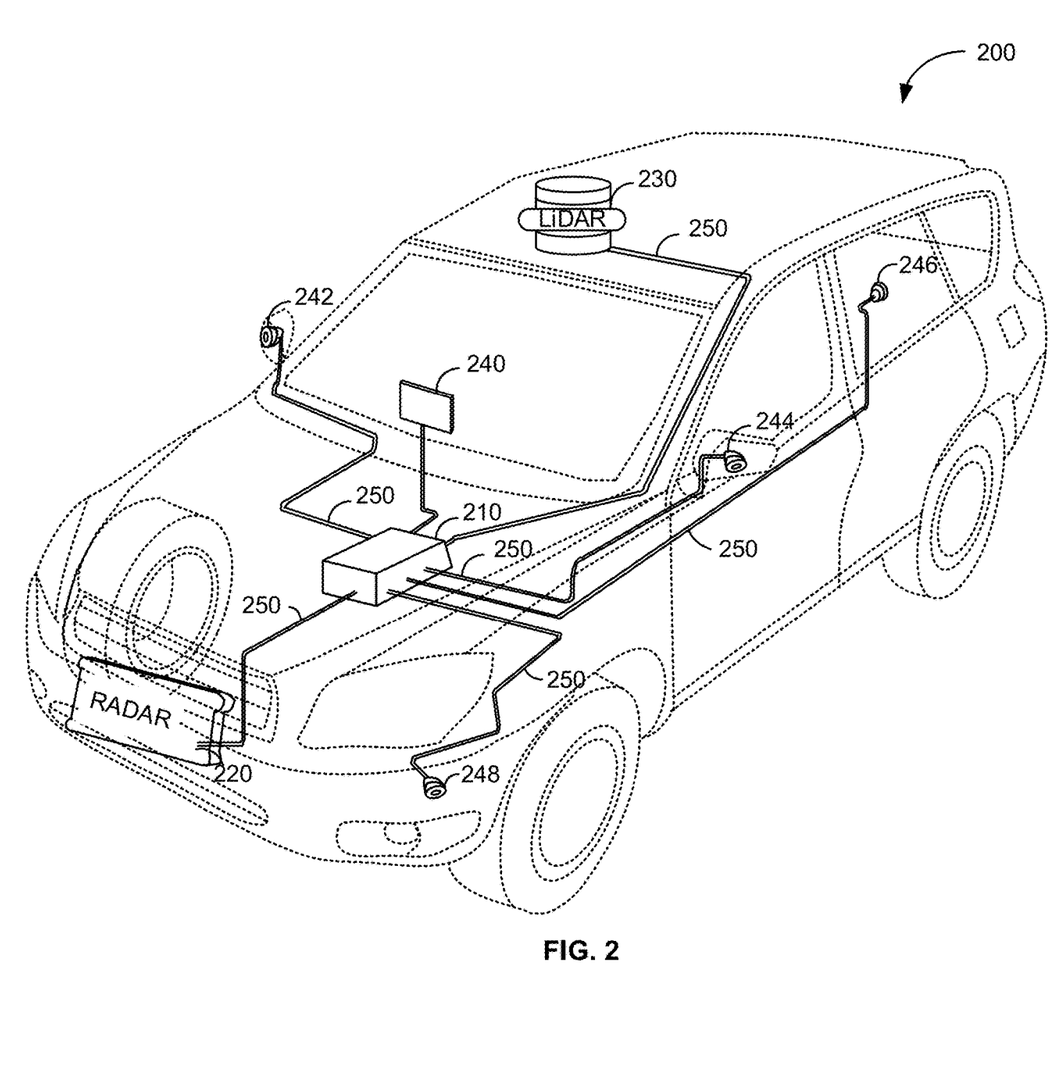
FIG. 2 illustrates an example network environment in which a radar system may be implemented in accordance with one or more implementations of the subject technology.

Attention is now directed to FIG. 2, which illustrates an example network environment 200 in which a radar system may be implemented in accordance with one or more implementations of the subject technology. The example network environment 200 includes a number of electronic devices 220, 230, 240, 242, 244, 246, and 248 that are coupled to an electronic device 210 via the transmission lines 250. The electronic device 210 may communicably couple the electronic devices 242, 244, 246, 248 to one another. In one or more implementations, one or more of the electronic devices 242, 244, 246, 248 are communicatively coupled directly to one another, such as without the support of the electronic device 210. Not all of the depicted components may be required, however, and one or more implementations may include additional components not shown in the figure. Variations in the arrangement and type of the components may be made without departing from the scope of the claims as set forth herein. Additional components, different components, or fewer components may be provided.

In some implementations, one or more of the transmission lines 250 are Ethernet transmission lines. In this respect, the electronic devices 220, 230, 240, 242, 244, 246, 248 and 210 may implement a physical layer (PHY) that is interoperable with one or more aspects of one or more physical layer specifications, such as those described in the Institute of Electrical and Electronics Engineers (IEEE) 802.3 Standards (e.g., 802.3ch). The electronic device 210 may include a switch device, a routing device, a hub device, or generally any device that may communicably couple the electronic devices 220, 230, 240, 242, 244, 246, and 248.

In one or more implementations, at least a portion of the example network environment 200 is implemented within a vehicle, such as a passenger car. For example, the electronic devices 242, 244, 246, 248 may include, or may be coupled to, various systems within a vehicle, such as a powertrain system, a chassis system, a telematics system, an entertainment system, a camera system, a sensor system, such as a lane departure system, a diagnostics system, or generally any system that may be used in a vehicle. In FIG. 2, the electronic device 210 is depicted as a central processing unit, the electronic device 220 is depicted as a radar system, the electronic device 230 is depicted as a lidar system having one or more lidar sensors, the electronic device 240 is depicted as an entertainment interface unit, and the electronic devices 242, 244, 246, 248 are depicted as camera devices, such as forward-view, rear-view and side-view cameras. In one or more implementations, the electronic device 210 and/or one or more of the electronic devices 242, 244, 246, 248 may be communicatively coupled to a public communication network, such as the Internet.

The electronic device 210 includes a multi-sensor fusion platform for processing data acquired by electronic devices 220, 230, 240, 242, 244, 246, and 248, including labeling objects detected and identified in the acquired data. Such objects may include structural elements in the environment near the vehicle such as roads, walls, buildings, road center medians and other objects, as well as other vehicles, pedestrians, bystanders, cyclists, plants, trees, animals and so on.

Figure 3:
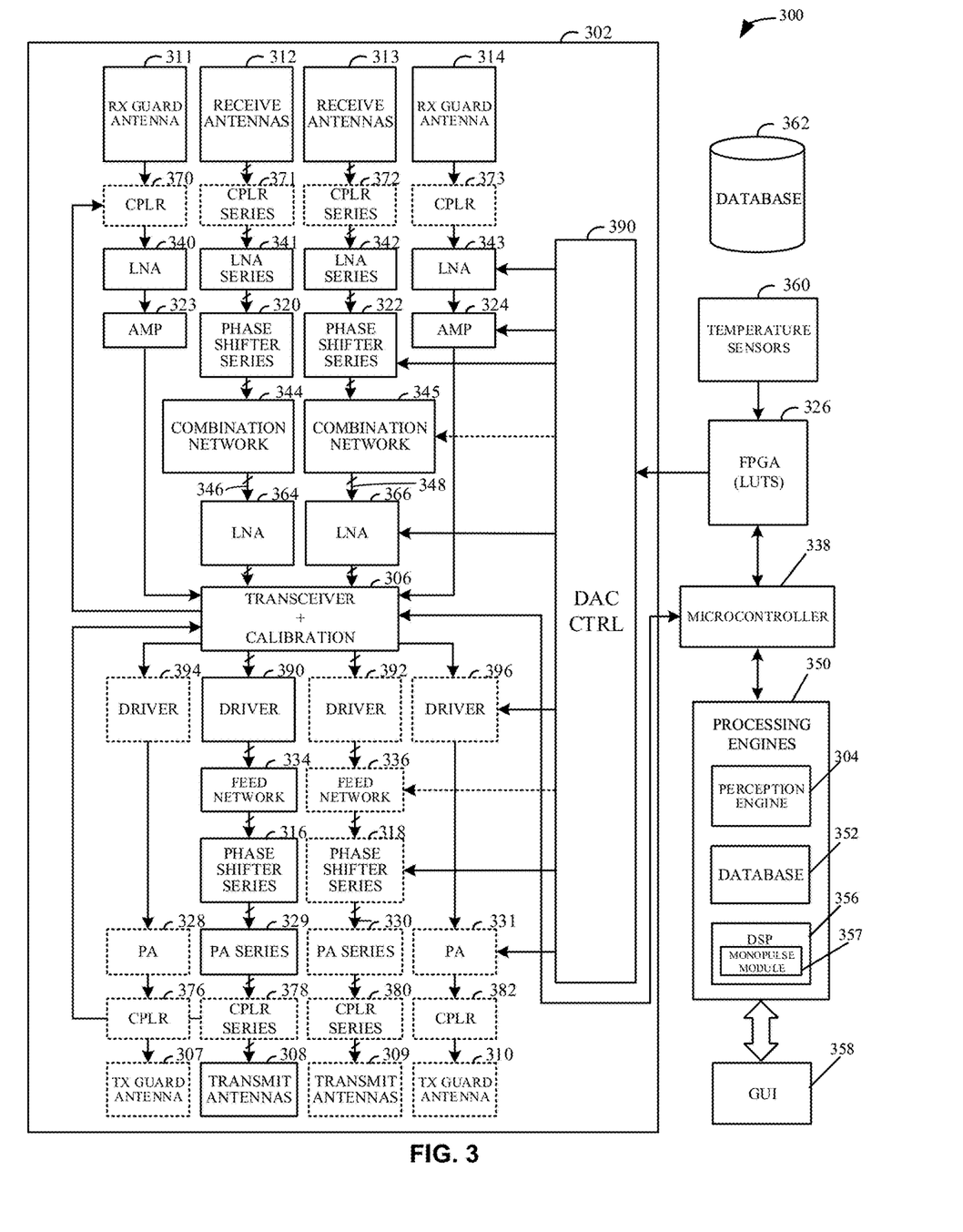
FIG. 3 illustrates a schematic diagram of a beam steering radar system as in FIG. 2 and in accordance with one or more implementations of the subject technology.

FIG. 3 illustrates a schematic diagram of a radar system 300 in accordance with various implementations of the subject technology. The radar module 300 includes a radar module 302 that comprises a receive chain and a transmit chain. The receive chain includes receive antennas 312 and 313, receive guard antennas 311 and 314, couplers 370-673, low-noise amplifiers (LNAs) 340-643, phase shifter (PS) circuits 320 and 322, amplifiers 323, 324, 364 and 366, and combination networks 344 and 345. The transmit chain includes drivers 390, 392, 394 and 396, feed networks 334 and 336, PS circuits 316 and 318, power amplifiers 328-631, couplers 376, 378, 380 and 382, transmit antennas 308 and 309, and transmit guard antennas 307 and 310. The radar module 302 also includes a transceiver 306, a digital-to-analog (DAC) controller 390, a Field-Programmable Gate Array (FPGA) 326, a microcontroller 338, processing engines 350, a Graphical User Interface (GUI) 358, temperature sensors 360 and a database 362. The processing engines 350 includes perception engine 304, database 352 and Digital Signal Processor (DSP) 356. Not all of the depicted components may he required, however, and one or more implementations may include additional components not shown in the figure. Variations in the arrangement and type of the components may be made without departing from the scope of the claims as set forth herein. Additional components, different components, or fewer components may be provided.

In some implementations, the electronic device 310 of FIG. 3 may include one or more of the FPGA 326, the microcontroller 338, the processing engines 350, the temperature sensors 360 or the database 362. In some implementations, the electronic device 340 of FIG. 3 is, or includes at least a portion of, the GUI 358.

Radar module 302 is capable of both transmitting RF signals within a FoV and receiving the reflections of the transmitted signals as they reflect from objects in the FoV. With the use of analog beamforming in radar module 302, a single transmit and receive chain can be used effectively to form a directional, as well as a steerable, beam. A transceiver 306 in radar module 302 can generate signals for transmission through a series of transmit antennas 308 and 309 as well as manage signals received through a series of receive antennas 312 and 313. Beam steering within the FoV is implemented with phase shifter (PS) circuits 316 and 318 coupled to the transmit antennas 308 and 309, respectively, on the transmit chain and PS circuits 320 and 322 coupled to the receive antennas 312 and 313, respectively, on the receive chain. Careful phase and amplitude calibration of the transmit antennas 308, 309 and receive antennas 312, 313 can be performed in real-time with the use of couplers integrated into the radar module 302 as described in more detail below. In other implementations, calibration is performed before the radar is deployed in an ego vehicle and the couplers may be removed.

The use of PS circuits 316, 318 and 320, 322 enables separate control of the phase of each element in the transmit antennas 308, 309 and receive antennas 312, 313. Unlike early passive architectures, the beam is steerable not only to discrete angles but to any angle (i.e., from 0° to 360°) within the FoV using active beamforming antennas. A multiple element antenna can be used with an analog beamforming architecture where the individual antenna elements may be combined or divided at the port of the single transmit or receive chain without additional hardware components or individual digital processing for each antenna element. Further, the flexibility of multiple element antennas allows narrow beam width for transmit and receive. The antenna beam width decreases with an increase in the number of antenna elements. A narrow beam improves the directivity of the antenna and provides the radar system 300 with a significantly longer detection range.

The major challenge with implementing analog beam steering is to design PSs to operate at 77 GHz. PS circuits 316, 318 and 320, 322 solve this problem with a reflective PS design implemented with a distributed varactor network fabricated using suitable semiconductor materials, such as Gallium-Arsenide (GaAs) materials, among others. Each PS circuit 316, 318 and 320, 322 has a series of PSs, with each PS coupled to an antenna element to generate a phase shift value of anywhere from 0° to 360° for signals transmitted or received by the antenna element. The PS design is scalable in future implementations to other semiconductor materials, such as Silicon-Germanium (SiGe) and CMOS, bringing down the PS cost to meet specific demands of customer applications. Each PS circuit 316, 318 and 320, 322 is controlled by a Field Programmable Gate Array (FPGA) 326, which provides a series of voltages to the PSs in each PS circuit that results in a series of phase shifts.

The DAC controller 390 is coupled to each of the LNAs 340-643, the amplifiers 323, 324, 364, 366, PS circuits 316, 318, 320, 322, the drivers 390, 392, 394, 396, and the power amplifiers (PAs) 328-631. In some aspects, the DAC controller 390 is coupled to the FPGA 326, and the FPGA 326 can drive digital signaling to the DAC controller 390 to provide analog signaling to the LNAs 340-643, the amplifiers 323, 324, 364, 366, PS circuits 316, 318, 320, 322, the drivers 390, 392, 394, 396, and the PAs 328-631. In some implementations, the DAC controller 390 is coupled to the combination networks 344, 345 and to the feed networks 334, 336.

In various examples, an analog control signal is applied to each PS in the PS circuits 316, 318 and 320, 322 by the DAC controller 390 to generate a given phase shift and provide beam steering. The analog control signals applied to the PSs in PS circuits 316, 318 and 320, 322 are based on voltage values that are stored in Look-up Tables (LUTs) in the FPGA 326. These LUTs are generated by an antenna calibration process that determines which voltages to apply to each PS to generate a given phase shift under each operating condition. Note that the PSs in PS circuits 316, 318 and 320, 322 can generate phase shifts at a very high resolution of less than one degree. This enhanced control over the phase allows the transmit and receive antennas in radar module 302 to steer beams with a very small step size, improving the capability of the radar system 300 to resolve closely located targets at small angular resolution.

In various examples, each of the transmit antennas 308, 309 and the receive antennas 312, 313 may be a meta-structure antenna, a phase array antenna, or any other antenna capable of radiating RF signals in millimeter wave frequencies. A meta-structure, as generally defined herein, is an engineered structure capable of controlling and manipulating incident radiation at a desired direction based on its geometry. Various configurations, shapes, designs and dimensions of the transmit antennas 308, 309 and the receive antennas 312, 313 may be used to implement specific designs and meet specific constraints.

The transmit chain in the radar module 302 starts with the transceiver 306 generating RF signals to prepare for transmission over-the-air by the transmit antennas 308 and 309. The RF signals may be, for example, Frequency-Modulated Continuous Wave (FMCW) signals. An FMCW signal enables the radar system 300 to determine both the range to an object and the object's velocity by measuring the differences in phase or frequency between the transmitted signals and the received/reflected signals or echoes. Within FMCW formats, there are a variety of waveform patterns that may be used, including sinusoidal, triangular, sawtooth, rectangular and so forth, each having advantages and purposes.

Once the FMCW signals are generated by the transceiver 306, the FMCW signals are fed to driver 390. From the driver 390, the signals are divided and distributed through feed network 334, which forms a power divider system to divide an input signal into multiple signals, one for each element of the transmit antennas 308. The feed network 334 may divide the signals so power is equally distributed among them or alternatively, so power is distributed according to another scheme, in which the divided signals do not all receive the same power. Each signal from the feed network 334 is then input to the PS circuit 316, where the FMCW signals are phase shifted based on control signaling from the DAC controller 390 (corresponding to voltages generated by the FPGA 326 under the direction of microcontroller 338), and then transmitted to the PA series 329. The amplified signaling from the PA series 329 is coupled to the transmit antennas 308. Signal amplification is needed for the FMCW signals to reach the long ranges desired for object detection, as the signals attenuate as they radiate by the transmit antennas 308.

In some implementations, the radar system 300 optionally includes multiple transmit chains. For example, a first transmit chain includes driver 390, feed network 334, phase shifter series 316, PA series 329, and transmit antennas 308, and a second transmit chain includes driver 392, feed network 336, phase shifter series 318, PA series 330, and transmit antennas 309. Once the FMCW signals are generated by the transceiver 306, the FMCW signals are fed to drivers 390 and 392. From the drivers 390 and 392, the signals are divided and distributed through feed networks 334 and 336, respectively, which form a power divider system to divide an input signal into multiple signals, one for each element of the transmit antennas 308 and 309, respectively. The feed networks 334 and 336 may divide the signals so power is equally distributed among them or alternatively, so power is distributed according to another scheme, in which the divided signals do not all receive the same power. Each signal from the feed networks 334 and 336 is then input to the PS circuits 316 and 318, respectively, where the FMCW signals are phase shifted based on control signaling from the DAC controller 390 (corresponding to voltages generated by the FPGA 326 under the direction of microcontroller 338), and then transmitted to the PAs 329 and 330. The amplified signaling from PAs 329 and 330 are respectively coupled to the transmit antennas 308 and 309. Signal amplification is needed for the FMCW signals to reach the long ranges desired for object detection, as the signals attenuate as they radiate by the transmit antennas 308 and 309.

In some implementations, the couplers 378 and 380 are optionally coupled to the PAs 329 and 330 for calibration purposes. For example, from the PAs 329 and 330, the FMCW signals are fed to couplers 378 and 380, respectively, to generate calibration signaling that is fed back to the transceiver 306. From the couplers 378 and 380, the FMCW signals are transmitted through transmit antennas 308 and 309 to radiate the outgoing signaling. In some implementations, the PS circuit 316 is coupled to the transmit antennas 308 through the PA 329 and coupler 378, and the PS circuit 318 is coupled to the transmit antennas 309 through the PA 330 and coupler 380.

In some implementations, the transceiver 306 feeds the FMCW signals to drivers 394 and 396, which are then fed to PAs 328 and 332 and to the couplers 376 and 382. In some aspects, the couplers 376 and 382 are coupled between the PAs 328 and 331 for calibration purposes. From these couplers, the FMCW signals are fed to the transmit guard antennas 307 and 310 for side lobe cancelation of the transmission signal. In some aspects, the transmit guard antennas 307 and 310 are optionally coupled to the PAs 328 and 331 and to the drivers 394 and 396.

The microcontroller 338 determines which phase shifts to apply to the PSs in PS circuits 316, 318, 320 and 322 according to a desired scanning mode based on road and environmental scenarios. Microcontroller 338 also determines the scan parameters for the transceiver to apply at its next scan. The scan parameters may be determined at the direction of one of the processing engines 350, such as at the direction of perception engine 304. Depending on the objects detected, the perception engine 304 may instruct the microcontroller 338 to adjust the scan parameters at a next scan to focus on a given area of the FoV or to steer the beams to a different direction.

In various examples and as described in more detail below, radar system 300 operates in one of various modes, including a full scanning mode and a selective scanning mode, among others. In a full scanning mode, the transmit antennas 308, 309 and the receive antennas 312, 313 can scan a complete FoV with small incremental steps. Even though the FoV may be limited by system parameters due to increased side lobes as a function of the steering angle, radar system 300 is able to detect objects over a significant area for a long-range radar. The range of angles to be scanned on either side of boresight as well as the step size between steering angles/phase shifts can be dynamically varied based on the driving environment. To improve performance of an autonomous vehicle (e.g., an ego vehicle) driving through an urban environment, the scan range can be increased to keep monitoring the intersections and curbs to detect vehicles, pedestrians or bicyclists. This wide scan range may deteriorate the frame rate (revisit rate) but is considered acceptable as the urban environment generally involves low velocity driving scenarios. For a high-speed freeway scenario, where the frame rate is critical, a higher frame rate can be maintained by reducing the scan range. In this case, a few degrees of beam scanning on either side of the boresight would suffice for long-range target detection and tracking.

In a selective scanning mode, the radar system 300 scans around an area of interest by steering to a desired angle and then scanning around that angle. This ensures the radar system 300 is to detect objects in the area of interest without wasting any processing or scanning cycles illuminating areas with no valid objects. Since the radar system 300 can detect objects at a long distance, e.g., 300 m or more at boresight, if there is a curve in a road, direct measures do not provide helpful information. Rather, the radar system 300 steers along the curvature of the road and aligns its beams towards the area of interest. In various examples, the selective scanning mode may be implemented by changing the chirp slope of the FMCW signals generated by the transceiver 306 and by shifting the phase of the transmitted signals to the steering angles needed to cover the curvature of the road.

Objects are detected with radar system 300 by reflections or echoes that are received at the receive antennas 312 and 313. In some implementations, the received signaling is fed directly to the LNAs 341 and 342. The LNAs 341 and 342 are positioned between the receive antennas 312 and 313 and PS circuits 320 and 322, which include PSs similar to the PSs in PS circuits 316 and 318. In other implementations, the received signaling is then fed to couplers 372 and 373 using feedback calibration signaling from the transceiver 306. The couplers 370, 372-674 can allow probing to the receive chain signal path during a calibration process. From the couplers 372 and 373, the received signaling is fed to LNAs 341 and 342.

For receive operation, PS circuits 320 and 322 create phase differentials between radiating elements in the receive antennas 312 and 313 to compensate for the time delay of received signals between radiating elements due to spatial configurations. Receive phase-shifting, also referred to as analog beamforming, combines the received signals for aligning echoes to identify the location, or position of a detected object. That is, phase shifting aligns the received signals that arrive at different times at each of the radiating elements in receive antennas 312 and 313. Similar to PS circuits 316, 318 on the transmit chain, PS circuits 320, 322 are controlled by the DAC controller 390, which provides control signaling to each PS to generate the desired phase shift. In some aspects, the FPGA 326 can provide bias voltages to the DAC controller 390 to generate the control signaling to PS circuits 320, 322.

The receive chain then combines the signals fed by the PS circuits 320 and 322 at the combination networks 344 and 345, respectively, from which the combined signals propagate to the amplifiers 364 and 366 for signal amplification. The amplified signal is then fed to the transceiver 306 for receiver processing. Note that as illustrated, the combination networks 344 and 345 can generate multiple combined signals 346 and 348, of which each signal combines signals from a number of elements in the receive antennas 312 and 313, respectively. In one example, the receive antennas 312 and 313 include 128 and 34 radiating elements partitioned into two 34-element and 32-element clusters, respectively. For example, the signaling fed from each cluster is combined in a corresponding combination network (e.g., 344, 345) and delivered to the transceiver 306 in a separate RF transmission line. In this respect, each of the combined signals 346 and 348 can carry two RF signals to the transceiver 306, where each RF signal combines signaling from the 34-element and 32-element clusters of the receive antennas 312 and 313. Other examples may include 8, 26, 34, or 32 elements, and so on, depending on the desired configuration. The higher the number of antenna elements, the narrower the beam width. In some implementations, the combination network 344 is coupled to the receive antennas 312 and the combination network 345 is coupled to receive antennas 313. In some aspects, the receive guard antennas 310 and 314 feed the receiving signaling to couplers 370 and 374, respectively, which are then fed to LNAs 340 and 343.

The filtered signals from the LNAs 340 and 343 are fed to amplifiers 323 and 324, respectively, which are then fed to the transceiver 306 for side lobe cancelation of the received signals by the receiver processing.

In some implementations, the radar module 302 includes receive guard antennas 310 and 314 that generate a radiation pattern separate from the main beams received by the 34-element receive antennas 312 and 313. The receive guard antennas 310 and 314 are implemented to effectively eliminate side-lobe returns from objects. The goal is for the receive guard antennas 310 and 314 to provide a gain that is higher than the side lobes and therefore enable their elimination or reduce their presence significantly. The receive guard antennas 310 and 314 effectively act as a side lobe filter. Similar, the radar module 302 includes transmit guard antennas 307 and 310 to eliminate side lobe formation or reduce the gain generated by transmitter side lobes at the time of a transmitter main beam formation by the transmit antennas 308 and 309.

Once the received signals are received by transceiver 306, the received signals are processed by processing engines 350. Processing engines 350 include perception engine 304 that detects and identifies objects in the received signal with one or more neural networks using machine learning or computer vision techniques, database 352 to store historical and other information for radar system 300, and the DSP engine 354 with an Analog-to-Digital Converter (ADC) module to convert the analog signals from transceiver 306 into digital signals that can be processed by the monopulse module 357 to determine AoA information for the localization, detection and identification of objects by perception engine 304. In one or more implementations, DSP engine 356 may be integrated with the microcontroller 338 or the transceiver 306.

Radar system 300 also includes a Graphical User Interface (GUI) 358 to enable configuration of scan parameters such as the total angle of the scanned area defining the FoV, the beam width or the scan angle of each incremental transmission beam, the number of chirps in the radar signal, the chirp time, the chirp slope, the chirp segment time, and so on as desired. In some implementations, the GUI 358 can provide for display a rendering of roadmap data that indicates range, velocity and AoA information for detected objects in the FoV. In some examples, the roadmap data can delineate between traffic moving toward the radar system 300 and traffic moving away (or receding from) the radar system 300 using a predetermined angular resolution (e.g., at or less than 1.6°) with angular precision based at least on the monopulse and/or guard channel detection techniques. In addition, radar system 300 has a temperature sensor 360 for sensing the temperature around the vehicle so that the proper voltages from FPGA 326 may be used to generate the desired phase shifts. The voltages stored in FPGA 326 are determined during calibration of the antennas under different operating conditions, including temperature conditions. A database 362 may also be used in radar system 300 to store radar and other useful data.

The radar data may be organized in sets of RD map information, corresponding to four-dimensional (4D) information that is determined by each RF beam reflected from targets, such as azimuthal angles, elevation angles, range, and velocity. The RD maps may be extracted from FMCW radar signals and may contain both noise and systematic artifacts from Fourier analysis of the radar signals. The perception engine 304 controls further operation of the transmit antennas 308 and 309 by, for example, providing an antenna control signal containing beam parameters for the next RF beams to be radiated from cells in the transmit antennas 308.

In operation, the microcontroller 338 is responsible for directing the transmit antennas 308 and 309 to generate RF beams with determined parameters such as beam width, transmit angle, and so on. The microcontroller 338 may, for example, determine the parameters at the direction of perception engine 304, which may at any given time determine to focus on a specific area of a FoV upon identifying targets of interest in the ego vehicle's path or surrounding environment. The microcontroller 338 determines the direction, power, and other parameters of the RF beams and controls the transmit antennas 308 and 309 to achieve beam steering in various directions. The microcontroller 338 also determines a voltage matrix to apply to reactance control mechanisms coupled to the transmit antennas 308 and 309 to achieve a given phase shift. In some examples, the transmit antennas 308 and 309 are adapted to transmit a directional beam through active control of the reactance parameters of the individual cells that make up the transmit antennas 308 and 309.

Next, the transmit antennas 308 and 309 radiate RF beams having the determined parameters. The RF beams are reflected from targets in and around the ego vehicle's path (e.g., in a 360° field of view) and are received by the transceiver 306. The receive antennas 312 and 313 send the received 4D radar data to the perception engine 304 for target identification.

In various examples, the perception engine 304 can store information that describes an FoV. This information may be historical data used to track trends and anticipate behaviors and traffic conditions or may be instantaneous or real-time data that describes the FoV at a moment in time or over a window in time. The ability to store this data enables the perception engine 304 to make decisions that are strategically targeted at a particular point or area within the FoV. For example, the FoV may be clear (e.g., no echoes received) for a period of time (e.g., five minutes), and then one echo arrives from a specific region in the FoV; this is similar to detecting the front of a car. In response, the perception engine 304 may determine to narrow the beam width for a more focused view of that sector or area in the FoV. The next scan may indicate the targets' length or other dimension, and if the target is a vehicle, the perception engine 304 may consider what direction the target is moving and focus the beams on that area. Similarly, the echo may be from a spurious target, such as a bird, which is small and moving quickly out of the path of the vehicle. The database 352 coupled to the perception engine 304 can store useful data for radar system 300, such as, for example, information on which subarrays of the transmit antennas 308 and 309 perform better under different conditions.

In various examples described herein, the use of radar system 300 in an autonomous driving vehicle provides a reliable way to detect targets in difficult weather conditions. For example, historically a driver will slow down dramatically in thick fog, as the driving speed decreases along with decreases in visibility. On a highway in Europe, for example, where the speed limit is 515 km/h, a driver may need to slow down to 50 km/h when visibility is poor. Using the radar system 300, the driver (or driverless vehicle) may maintain the maximum safe speed without regard to the weather conditions. Even if other drivers slow down, a vehicle enabled with the radar system 300 can detect those slow-moving vehicles and obstacles in its path and avoid/navigate around them.

Additionally, in highly congested areas, it is necessary for an autonomous vehicle to detect targets in sufficient time to react and take action. The examples provided herein for a radar system increase the sweep time of a radar signal to detect any echoes in time to react. In rural areas and other areas with few obstacles during travel, the perception engine 304 adjusts the focus of the RF beam to a larger beam width, thereby enabling a faster scan of areas where there are few echoes. The perception engine 304 may detect this situation by evaluating the number of echoes received within a given time period and making beam size adjustments accordingly. Once a target is detected, the perception engine 304 determines how to adjust the beam focus. This is achieved by changing the specific configurations and conditions of the transmit antennas 308. In one example scenario, a subset of unit cells is configured as a subarray. This configuration means that this set may be treated as a single unit, and all the cells within the subarray are adjusted similarly. In another scenario, the subarray is changed to include a different number of unit cells, where the combination of unit cells in a subarray may be changed dynamically to adjust to conditions and operation of the radar system 300.

All of these detection scenarios, analysis and reactions may be stored in the perception engine 304, such as in the database 352, and used for later analysis or simplified reactions. For example, if there is an increase in the echoes received at a given time of day or on a specific highway, that information is fed into the microcontroller 338 to assist in proactive preparation and configuration of the transmit antennas 308 and 309. Additionally, there may be some subarray combinations that perform better, such as to achieve a desired result, and this is stored in the database 352.

Figure 4:
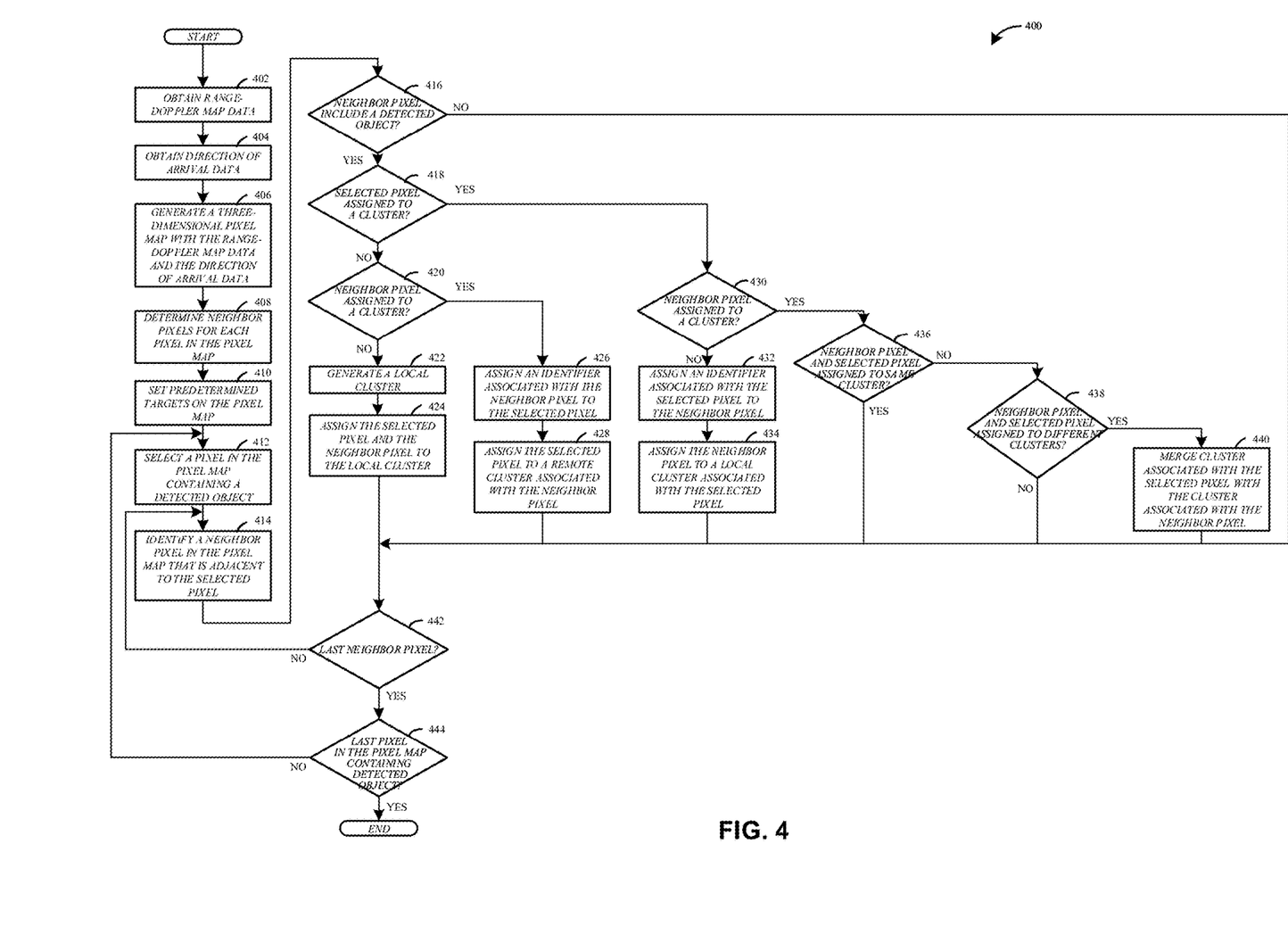
FIG. 4 illustrates a flowchart of an example process of optimized proximity clustering in a vehicle radar for object identification, in accordance with various implementations of the subject technology.

Attention is now directed to FIG. 4, which illustrates a flowchart of an example process 400 of optimized proximity clustering in a vehicle radar for object identification, in accordance with various implementations of the subject technology. For explanatory purposes, the example process 400 is primarily described herein with reference to FIG. 3; however, the example process 400 is not limited to the radar system 300 of FIG. 3, and the example process 400 can be performed by one or more other components of the radar system 300 of FIG. 3, such as, for example, the processing engines 350. Further for explanatory purposes, the blocks of the example process 400 are described herein as occurring in serial, or linearly. However, multiple blocks of the example process 400 can occur in parallel. In addition, the blocks of the example process 400 can be performed in a different order than the order shown and/or one or more of the blocks of the example process 400 are not performed.

The process 400 begins at step 402, where range-Doppler map data is obtained. For example, the radar data may be organized in sets of RD map information, corresponding to four-dimensional (4D) information that is determined by each RF beam reflected from targets, such as azimuthal angles, elevation angles, range, and velocity. In some implementations, the RD map information corresponds to two-dimensional information, such as range and velocity. In some aspects, the RD map information may include 256 bins containing range information at intervals of 1.3 m, and may include 128 bins containing velocity information at intervals of 1 m/s for velocities in a range of −64 m/s to +64 m/s.

Subsequently, at step 404, direction of arrival (or angle-of-arrival) data is obtained. For example, the monopulse module 357 can determine AoA information for the localization, detection and identification of objects. In some aspects, the AoA information can be partitioned into one of 121 bins that are organized at intervals of about 0.37° for a total FoV scan range of −22.5° to +22.5°.

Next, at step 406, a three-dimensional pixel map is generated with the RD map data and the direction of arrival data. In this respect, the 3D coordinate system has the range data corresponding to a first axis (e.g., x-axis), the velocity data corresponding to a second axis (e.g., y-axis), and the angle-of-arrival data corresponding to a third axis (e.g., z-axis). In some implementations, the 3D coordinate system (denoted as [x, y, z]) can be a 3D coordinate vector, where the x coordinate is a vector in the range of [0, 255], the y coordinate is a vector in the range of [0, 127], and the z coordinate in the range of [0, 120]. These values correspond to the bin value for the respective data type. The bin values may vary and may be respective arbitrary values depending on the radar system implementation.

Subsequently, at step 408, neighbor pixels for each pixel in the pixel map are determined. For example, for a given pixel in the 3D pixel map, there are 18 possible neighbors based on their linear independencies. In some aspects, this step traverses about half the number of possible paths to neighbors (or about 9) for purposes of simplicity and efficiency.

Next, at step 410, a number of predetermined targets (or detected objects) are set on the pixel map. In some implementations, the detection information indicating any detected objects in the FoV is provided in advance by the perception engine 304.

Subsequently, at step 412, a pixel in the pixel map that contains a detected object is selected. In some aspects, the pixel may be selected based on the detection information. In this respect, the process of traversing each pixel in the pixel map is not necessary since the process 400 aims to reduce latency and increase system performance by curtailing the number of pixels needed for traversal in order to optimize the proximity clustering of radar detections.

Next, at step 414, a neighbor pixel in the pixel map that is adjacent to the selected pixel is identified. As described in step 408, there are a number of possibilities in traversing from the selected pixel to neighboring pixels.

Subsequently, at step 416, a determination is made as to whether the neighbor pixel includes a detected object. If the neighbor pixel includes a detected object, then the process 400 proceeds to step 418. Otherwise, the process 400 proceeds to step 442. In some aspects, the detection information can indicate whether the particular neighbor pixel includes a detected object.

At step 418, a determination is made as to whether the detected object in the selected pixel is assigned to a cluster. If the selected pixel is assigned to a cluster, then the process 400 proceeds to step 430. Otherwise, the process proceeds to step 420. In some aspects, the pixel coordinate can include information of the pixel such as whether the detected object corresponding to the pixel includes a cluster identifier that indicates a cluster.

At step 420, a determination is made as to whether the neighbor pixel is assigned to a cluster. If the neighbor pixel is assigned to a cluster, then the process 400 proceeds to step 426. Otherwise, the process proceeds to step 422.

At step 422, a local cluster is generated. Next, at step 424, the selected pixel and the neighbor pixel are assigned to the local cluster. In this respect, both pixels are assigned with a same identifier that indicates the same local cluster.

Referring back to step 426 where the neighbor pixel is determined to be assigned to a cluster, an identifier associated with the neighbor pixel is assigned to the selected pixel. Next, at step 428, the selected pixel is assigned to a remote cluster associated with the neighbor pixel. Subsequently, the process 400 proceeds to step 442.

Referring back to step 430 where the selected pixel is determined to be assigned to a cluster, a further determination is made as to whether the neighbor pixel is also assigned to a cluster. If the neighbor cluster is assigned to a cluster, then the process 400 proceeds to step 436. Otherwise, the process 400 proceeds to step 432.

At step 432, an identifier associated with the selected pixel is assigned to the neighbor pixel. Next, at step 434, the neighbor pixel is assigned to a local cluster associated with the selected pixel. Subsequently, the process 400 proceeds to step 442.

At step 436, a determination is made as to whether the neighbor pixel and the selected pixel are both assigned to the same cluster. If both pixels are assigned to the same cluster, then the process 400 proceeds to step 442. Otherwise, the process 400 proceeds to step 438.

At step 438, a determination is made as to whether the neighbor pixel and the selected pixel are assigned to different clusters. If the pixels are assigned to different clusters, then the process 400 proceeds to step 440. Otherwise, the process 400 proceeds to step 442.

Subsequently, at step 440, the two different clusters are merged, in which the cluster associated with the selected pixel mergers with the cluster associated with the neighbor pixel. In some aspects, the neighbor pixel is assigned an identifier associated with the selected pixel to denote that both pixels are now assigned to the same cluster.

Subsequently, at step 442, a determination is made as to whether the neighbor pixel identified in step 414 is the last neighbor pixel adjacent to the selected pixel. If the neighbor pixel is the last neighbor pixel, then the process 400 proceeds to step 444. Otherwise, the process 400 proceeds back to step 414 to identify a new neighbor pixel adjacent to the selected pixel.

At step 444, a determination is made as to whether the selected pixel is the last pixel in the pixel map that contains a detected object. If the selected pixel is the last pixel, then the process 400 terminates. Otherwise, the process 400 proceeds back to step 412 to select a new pixel in the pixel map that contains a detected object.

Figure 5:
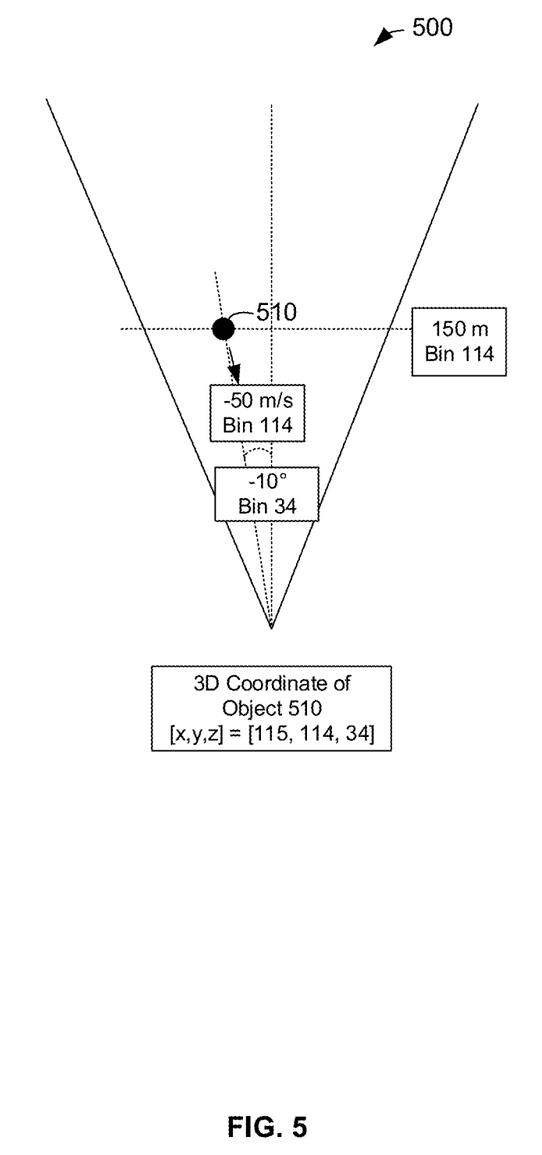
FIG. 5 illustrates an exemplary graph of road map data generated from Range-Doppler (RD) map information and direction of arrival data in accordance with various implementations of the subject technology.

FIG. 5 illustrates an exemplary graph 500 of road map data generated from RD map information and direction of arrival data in accordance with various implementations of the subject technology. The graph 500 includes a two-dimensional plot that indicates range, velocity and direction of arrival for a detected object 510. For example, the graph 500 indicates a detected object with a measured range at 150 meters from the radar that is traveling toward the radar at a velocity of −50 m/s. The detected object is measured at a direction of arrival of about 10° relative to the radar. From the graph 500, the 3D coordinate can be composed of the range, velocity and angle-of-arrival measurements. As described in FIG. 4, the 3D coordinate system (denoted as [x, y, z]) can be a 3D coordinate vector, where the x coordinate is a vector in the range of [0, 255], they coordinate is a vector in the range of [0, 127], and the z coordinate in the range of [0, 120]. These values correspond to the bin value for the respective data type. For example, the 3D coordinate of the detected object 510 can be expressed as [115, 114, 88], where the range value of 150 m corresponds to bin 115 (e.g., 1.3 m intervals), the velocity value of −50 m/s corresponds to bin 114 (e.g., 1 m/s intervals), and the angle-of-arrival at −10° corresponds to bin 34 (e.g., 0.37° intervals).

Figure 6:
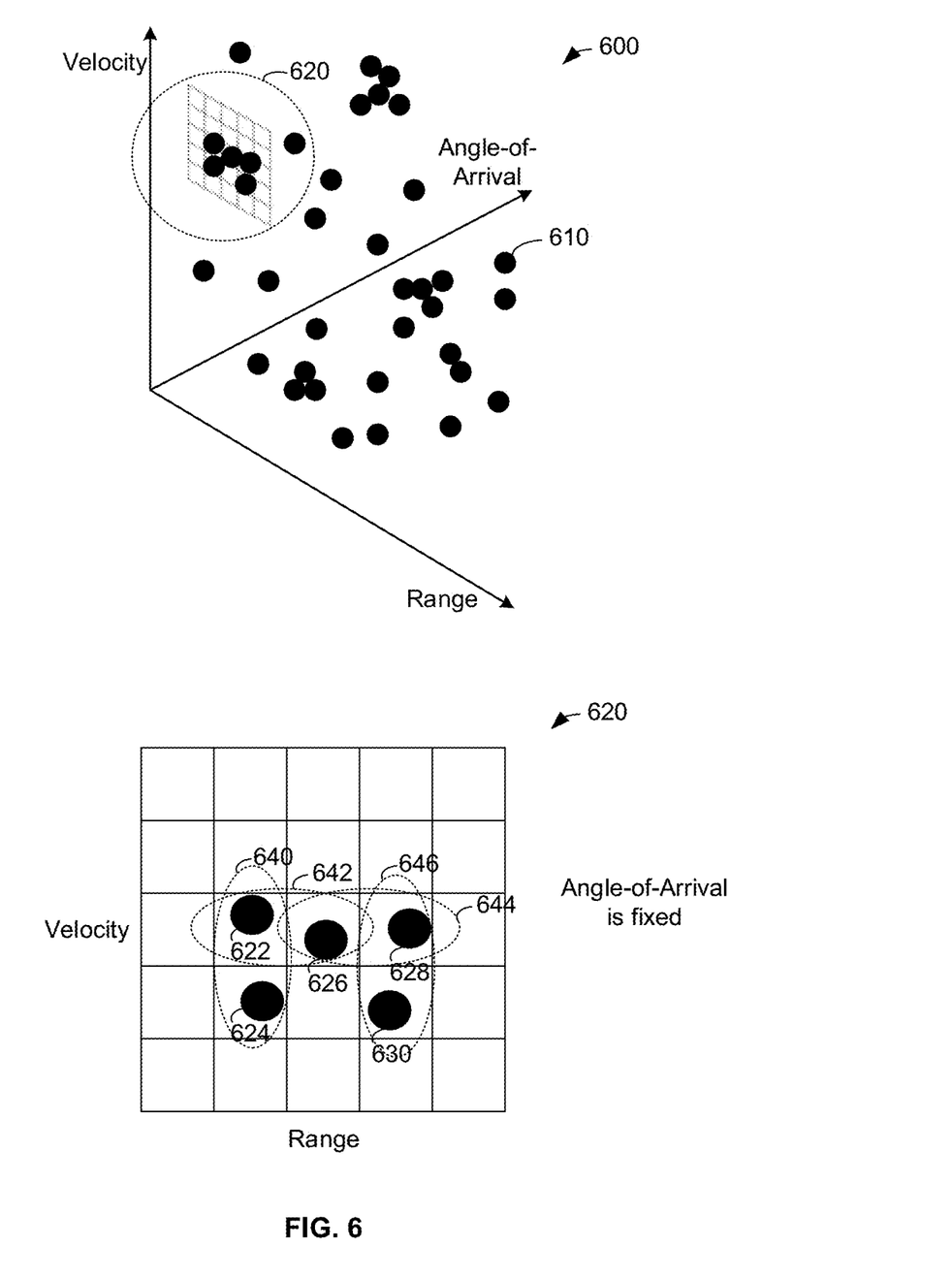
FIG. 6 conceptually illustrates a plot of detected objects in a three-dimensional (3D) pixel map in accordance with various implementations of the subject technology; an FIG. 7 illustrates a perception engine, in accordance with various implementations of the subject technology.

FIG. 6 conceptually illustrates a plot 600 of detected objects in a 3D pixel map in accordance with various implementations of the subject technology. The plot 600 includes multiple detected objects, including detected object 610. The plot 600 is a three-dimensional plot having range information in the x-axis, velocity information in the y-axis, and angle-of-arrival information in the z-axis. The plot 600 depicts detected objects as plotted individually or clustered with other neighboring detected objects. In some aspects, a cutout 620 depicts a two-dimensional pixel map where the angle-of-arrival is fixed, such that the pixel locations of the detected objects are a function of velocity and range. In the cutout 620, detected objects 622, 624, 626, 628 and 630 are located in respective pixels. Based on the process 400, a pixel can be selected to initiate the optimized proximity clustering of such detected objects. For example, the detected object 622 can be selected and neighboring pixels can be identified. In this example, the neighboring pixel along traversal 640 includes a neighbor pixel with a detected object. As such, a determination can be made as to whether that neighbor pixel (or detected object in that neighbor pixel) is assigned an identifier indicating a cluster. In the traversal 642, another neighbor pixel containing the detected object 626 is identified. Similarly, a determination is made as to whether the detected object 626 is assigned to a cluster. If the selected pixel containing the detected object 622 is not assigned a cluster and neither is the detected object 626 in the neighbor pixel, then both can be assigned to the same cluster. In some aspects, a different pixel that contains the detected object 628 may be selected as part of the flow to optimize proximity clustering, and neighboring pixels that contain the detected objects 626 and 630 are identified. In this respect, a determination is made as to whether any of the detected objects 626 and 630 are assigned to a cluster. In the prior example, the detected object 626 was assigned to the same cluster as that of the detected object 622. In this example, if the selected pixel containing the detected object 628 is not yet assigned to a cluster, then the detected object 628 may be assigned to the same cluster as that of detected objects 622 and 626. Several outcomes can be achieved in optimizing the proximity clustering in accordance with the process 400 as described in FIG. 4.

Figure 7:
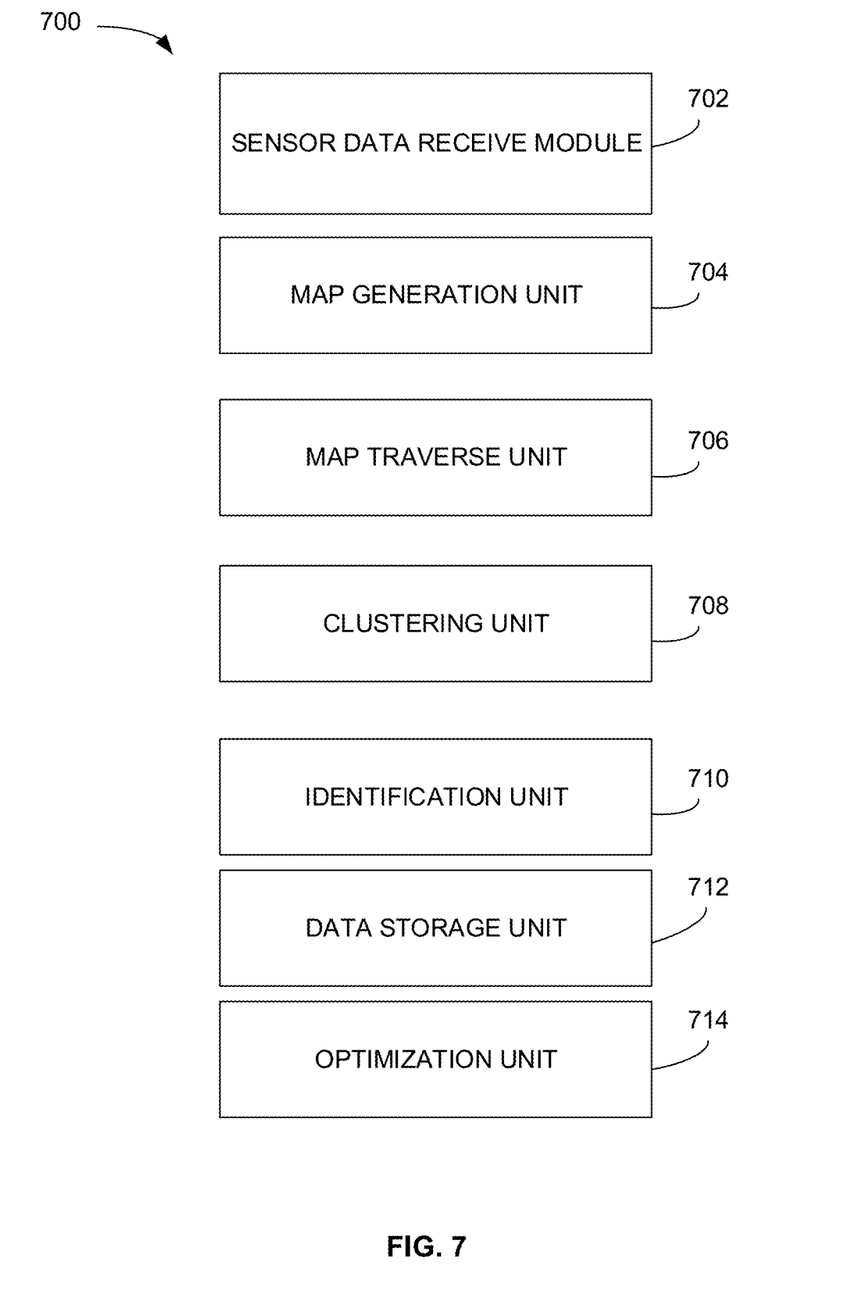

An example of a perception engine 700 is illustrated in FIG. 7, which may be implemented as an ASIC, firmware, software or other combination for processing data, such as sensor data received from a radar module. The perception engine 700 includes a sensor data receive module 702 adapted to receive sensor inputs. The perception engine 700 then processes this information to identify targets or objects detected by the sensor unit. In the present example a radar unit is considered, however, alternate embodiments may use other types of data, including sensor data and so forth. A map generation unit 704 projects data into a three-dimensional map, where detected targets are referred to as pixels. For example, two-dimensional RDM data may be mapped using radar angle of arrival data as discussed herein. The map traverse unit 706 evaluates a map to identify proximate points or pixels. The clustering unit 708 then clusters proximate pixels together, if any. The identification unit 710 provides additional information relating to a target based on the clusters of pixels. For example, a cluster may identify a large truck or sets of clusters may identify individual objects within an angle of arrival space. A data storage unit 712 is used to store information calculated by the perception engine 700. An optimization unit 714 monitors operation of the perception engine 700 to improve performance. The perception engine 700 may be part of a radar sensing system or a sensor fusion or other system for a vehicle. As a radar beam's angle of arrival projects into a three-dimensional space, the present inventions provide clarity and information as to various objects detected within that space.

A beam steering radar system described herein above supports autonomous driving with improved sensor performance, all-weather/all-condition detection, advanced decision-making algorithms and interaction with other sensors through sensor fusion. These configurations optimize the use of radar sensors, as radar is not inhibited by weather conditions in many applications, such as for self-driving cars. The radar described here is effectively a "digital eye," having true 3D vision and capable of human-like interpretation of the world.

It is appreciated that the previous description of the disclosed examples is provided to enable any person skilled in the art to make or use the present disclosure. Various modifications to these examples will be readily apparent to those skilled in the art, and the m spirit or scope of the disclosure. Thus, the present disclosure is not intended to be limited to the examples shown herein but is to be accorded the widest scope consistent with the principles and novel features disclosed herein.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. Moreover, the separation of various system components in the aspects described above should not be understood as requiring such separation in all aspects, and it should be understood that the described program components and systems can generally be integrated together in a single hardware product or packaged into multiple hardware products. Other variations are within the scope of the following claim.

What is claimed is:

1. A radar system for use in an autonomous vehicle, comprising:
   an antenna module comprising one or more transmit antennas that are configured to radiate one or more transmission radio frequency (RF) beams within a field of view (FoV) scan range of a surrounding environment of the autonomous vehicle and a plurality of receive antennas configured to receive one or more return RF beams reflected from the surrounding environment and generate radar data from the one or more return RF beams; and
   a perception module coupled to the antenna module and configured to detect and identify one or more objects from the one or more return RF beams, wherein the perception module is further configured to:
      generate a three-dimensional (3D) pixel map from radar data including angle of arrival data,
         wherein the angle of arrival data are partitioned into a plurality of bins that are organized at a specified angle interval for the FoV scan range,
         wherein the 3D pixel map comprises a 3D coordinate vector having range data in a first axis, velocity data in a second axis, and the angle of arrival data in a third axis, and
         wherein the perception module is further configured to change the FoV based on a detection of the one or more objects;
      traverse the 3D pixel map to identify other pixels containing the one or more detected objects that neighbor a subject pixel;
      determine whether the subject pixel and a neighbor pixel are assigned to clusters;
      assign the detected object in the neighbor pixel to a same cluster as that of the subject pixel when the subject pixel is assigned to a cluster and not the neighbor pixel;
      assign the detected object in the subject pixel to a same cluster as that of the neighbor pixel when the neighbor pixel is assigned to a cluster and not the subject pixel; and
      merge a first cluster associated with the subject pixel and a second cluster associated with the neighbor pixel when the subject pixel and the neighbor pixel are assigned to different clusters.

2. The radar system as in claim 1, wherein the antenna module further comprises:
   a range Doppler mapping (RDM) unit adapted to calculate at least one parameter of the one or more detected objects from the one or more return RF beams.

3. The radar system as in claim 2, wherein the at least one parameter is a range distance from the radar system to the one or more detected objects.

4. The radar system as in claim 2, wherein the at least one parameter is a velocity of the one or more detected objects.

5. The radar system as in claim 2, wherein the antenna module further comprises:
   an angle of arrival determination unit configured to identify the angle of arrival of the one or more return RF beams from the one or more detected objects.

6. The radar system as in claim 5, wherein the angle of arrival determination unit is implemented in computer readable instructions.

7. The radar system as in claim 5, wherein the perception module is further configured to receive a set of information from the one or more return RF beams from the one or more detected objects, including RDM and angle of arrival information.

8. The radar system as in claim 7, wherein the perception module is further configured to use the set of information in generating the 3D pixel map.

9. The radar system as in claim 1, further comprising at least one environmental sensor, wherein information from the environmental sensor is provided to the perception module for determining environmental information.

10. The radar system as in claim 1, further comprising a database configured to store data calculated by the perception module.

11. A perception system for identification of an object, comprising:
    a beam steering radar configured for scanning within a field of view (FoV) scan range; and
    a perception engine operatively coupled to the beam steering radar, the perception engine comprising:
       an optimizing proximity clustering module configured to receive radar data of the object from the beam steering radar;
       a pixel map generation unit configured to generate a three-dimensional (3D) pixel map from two-dimensional information including angle of arrival data from the radar data,
          wherein the angle of arrival data are partitioned into a plurality of bins that are organized at a specified angle interval for the FoV scan range, and
          wherein the 3D pixel map comprises a 3D coordinate vector having range data in a first axis, velocity data in a second axis, and the angle of arrival data in a third axis; and
       a pixel traverse unit,
          wherein the perception module is configured to change the FoV based on a detection of the object.

12. The perception system as in claim 11, wherein the angle of arrival data is generated from a return radar signal from the object, and wherein the two-dimensional information is range information and the three-dimensional pixel map is generated by incorporating the angle of arrival data.

13. The perception system as in claim 11, wherein the pixel traverse unit is configured to evaluate the object having a representation of a first pixel, and wherein the pixel traverse unit is further configured to identify other pixels corresponding to other objects proximate the object.

14. The perception system as in claim 13, further comprising:
a clustering unit configured to cluster the first pixel and the other pixels into a first cluster.

15. The perception system as in claim 14, wherein the perception engine is further configured to assign additional pixels to the first cluster if there are the other objects proximate the object.

16. The perception system as in claim 14, wherein the clustering unit is further configured to merge clusters of pixels when clusters are proximate each other.

17. The perception system as in claim 14, wherein the first cluster represents a single object or identifies multiple objects.

18. The perception system as in claim 17, wherein the perception engine is further configured to identify undefined shapes of various sizes.

19. A method of angular resolution refinement, comprising:
transmitting a radio frequency (RF) beam within a field of view (FoV) scan range of a surrounding environment with a beam steering radar system;
receiving return RF beams from the surrounding environment at a plurality of receive antennas of the beam steering radar system;
generating radar data from the return RF beams and detecting one or more objects from the radar data;
generating a three-dimensional (3D) pixel map from the radar data including angle of arrival data,
wherein the angle of arrival data are partitioned into a plurality of bins that are organized at a specified angle interval for the FoV scan range, and
wherein the 3D pixel map comprises a 3D coordinate vector having range data in a first axis, velocity data in a second axis, and the angle of arrival data in a third axis;
traversing the 3D pixel map to identify other pixels containing a detected object that neighbors a subject pixel;
changing the FoV based on a detection of the detected object;
determining whether the subject pixel and a neighbor pixel are assigned to clusters;
assigning the detected object in the neighbor pixel to a same cluster as that of the subject pixel when the subject pixel is assigned to a cluster and not the neighbor pixel;
assigning the detected object in the subject pixel to a same cluster as that of the neighbor pixel when the neighbor pixel is assigned to a cluster and not the subject pixel; and
merging a first cluster associated with the subject pixel and a second cluster associated with the neighbor pixel when the subject pixel and the neighbor pixel are assigned to different clusters.

* * * * *